(12) United States Patent
Churchill et al.

(10) Patent No.: US 9,296,503 B2
(45) Date of Patent: Mar. 29, 2016

(54) PRODUCT STABILIZER

(71) Applicant: Delkor Systems, Inc., St. Paul, MN (US)

(72) Inventors: Matthew Henry Churchill, Blaine, MN (US); Jeremiah Joe Ericson, Dayton, MN (US)

(73) Assignee: Delkor Systems, Inc., St. Paul, MN (US)

( * ) Notice: Subject to any disclaimer, the term of this patent is extended or adjusted under 35 U.S.C. 154(b) by 136 days.

(21) Appl. No.: 14/445,708

(22) Filed: Jul. 29, 2014

(65) Prior Publication Data

US 2015/0027965 A1 Jan. 29, 2015

Related U.S. Application Data

(60) Provisional application No. 61/859,409, filed on Jul. 29, 2013.

(51) Int. Cl.
| | | |
|---|---|---|
| B65G 47/00 | (2006.01) | |
| B65B 35/44 | (2006.01) | |
| B65G 21/20 | (2006.01) | |
| B65G 47/84 | (2006.01) | |
| B65B 21/06 | (2006.01) | |

(52) U.S. Cl.
CPC ............ *B65B 35/44* (2013.01); *B65G 21/2045* (2013.01); *B65G 47/841* (2013.01); *B65B 21/06* (2013.01)

(58) Field of Classification Search
CPC . B65G 21/2045; B65G 47/841; B65G 17/323
USPC .......................................................... 414/784
See application file for complete search history.

(56) References Cited

U.S. PATENT DOCUMENTS

| | | | | |
|---|---|---|---|---|
| 5,531,056 A * | 7/1996 | Liang | ...................... | B65B 59/00 |
| | | | | 493/478 |
| 5,724,785 A | 3/1998 | Malanowski | | |
| 5,852,912 A | 12/1998 | Chalendar | | |
| 6,182,422 B1 * | 2/2001 | Andersen | ................ | B65B 15/00 |
| | | | | 53/442 |
| 7,316,103 B2 * | 1/2008 | Ford | ........................ | B65B 5/068 |
| | | | | 53/228 |
| 7,543,424 B2 * | 6/2009 | Lechner | ................. | B65G 17/25 |
| | | | | 198/792 |
| 2005/0103603 A1 * | 5/2005 | Hartness | .............. | B65G 17/323 |
| | | | | 198/803.3 |
| 2011/0168525 A1 * | 7/2011 | Vasse | ................... | B65G 47/841 |
| | | | | 198/419.1 |
| 2014/0363266 A1 * | 12/2014 | Cooper | .................. | B65G 57/00 |
| | | | | 414/790.2 |

FOREIGN PATENT DOCUMENTS

EP 0706483 4/2004

* cited by examiner

*Primary Examiner* — Thomas Randazzo
(74) *Attorney, Agent, or Firm* — Beck Tysver Evans, PLLC

(57) ABSTRACT

A product stabilizer is employed to prevent tipping or shingling of product in a packaging line. The product stabilizer utilizes a linear actuator, coupled to a plurality of arms, to ensure proper spacing between adjacent products in the packaging line.

17 Claims, 17 Drawing Sheets

PRODUCT STABILIZER

CROSS-REFERENCE TO RELATED APPLICATIONS

This Application claims the benefit of and priority to U.S. Provisional Application No. 61/859,409, filed Jul. 29, 2013, which is herein incorporated by reference.

STATEMENT REGARDING FEDERALLY SPONSORED RESEARCH

Not Applicable.

BACKGROUND OF THE INVENTION

The packaging and product handling industry some package geometries can be difficult to process. One area impacted by such package geometries is the pick-up area of loading lines. Packages having a small base relative to the height, or small base relative to a large top, can be somewhat unstable, especially as a number of packages congregate and contact each other at the pick-up area. A particular problem with packages having a small base relative to height or small base relative to a large top is that they tend to tip or "shingle." Product "shingling" is illustrated in FIG. 1, showing the PRIOR ART. Tipping or shingling can prevent the package from being picked-up by a loader.

Consequently, there remains a need in the art to prevent tipping and shingling and provide stability for the packages.

The art referred to and/or described above is not intended to constitute an admission that any patent, publication or other information referred to herein is "prior art" with respect to this invention. In addition, this section should not be construed to mean that a search has been made or that no other pertinent information as defined in 37 C.F.R. §1.56(a) exists.

All US patents and applications and all other published documents mentioned anywhere in this application are incorporated herein by reference in their entirety.

Without limiting the scope of the invention a brief summary of some of the claimed embodiments of the invention is set forth below. Additional details of the summarized embodiments of the invention and/or additional embodiments of the invention may be found in the Detailed Description of the Invention below.

BRIEF SUMMARY OF THE INVENTION

In some embodiments, a product stabilizer comprises a plurality of elongate members and each of the elongate members has a length and a frame. At least one of the elongate members comprises a tie rod and a plurality of arms. The tie rod extends along at least a portion of the length of the elongate member. The tie rod is movable with respect to the frame. The arms are pivotally engaged to the frame and coupled to the tie rod. The arms have an extended configuration and a retracted configuration such that the arms move between the retracted and extended configurations upon movement of the tie rod.

In some embodiments, the product stabilizer further comprises a linear actuator. The tie rod is attached to the linear actuator.

In some embodiments, the tie rod comprises a plurality of fasteners and each of the arms has an elongate hole. The fasteners extend through the elongate holes.

In some embodiments, the arms sweep an arc when moving between the retracted configuration and extended configuration.

In some embodiments, the arms are located on both sides of at least one of the elongate members.

In some embodiments, a product stabilizer for stabilizing adjacent products in a packaging line comprises a plurality of elongate members, a torque rod, a plurality of paddle members attached to the torque rod, and an actuator mounted to the frame. Each of the elongate members has a length and a frame. The elongate members define a space between adjacent elongate members. The torque rod extends along at least a portion of the length of the frame. The actuator is configured to rotate the torque rod and paddle members from a retracted configuration to a deployed configuration. In the deployed configuration, the paddle members extend into the space between adjacent elongate members. The paddle members are configured to contact and separate adjacent products.

In some embodiments, the actuator is a linear actuator.

In some embodiments, the product stabilizer further comprises a helical cam connected to the linear actuator. The helical cam is configured to translate the linear motion of the linear actuator into the rotational motion of the torque rod and paddle members.

In some embodiments, the linear actuator is connected to a cam member and the cam member comprises a helical slot.

In some embodiments, the torque rod has a guide pin and the guide pin extends into the helical slot.

In some embodiments the product stabilizer further comprises a housing attached to the frame. The cam member is disposed at least partially within the housing.

In some embodiments, the paddles define a perimeter and the perimeter of at least one of the paddles has a concave portion and a convex portion.

In some embodiments, a system for stabilizing a conveyed product comprises a plurality of adjacent elongate members configured to receive products therebetween, in single-file, and an actuator having coupled thereto a plurality of product separating members. The product separating members are movable by the actuator between a product contacting configuration and a retracted configuration. In the product contacting configuration, the separating members separate at least a portion of adjacent products, which are arranged in single-file, from one another.

In some embodiments, each of the elongate members comprises a frame. The actuator is attached to at least one of the frames.

In some embodiments, the system further comprises an end plate and the actuator is attached to the end plate.

In some embodiments, the product separating members comprise fingers.

In some embodiments, the product separating members comprise paddle members.

BRIEF DESCRIPTION OF THE SEVERAL VIEWS OF THE DRAWING(S)

DETAILED DESCRIPTION OF THE INVENTION

Figure 1:
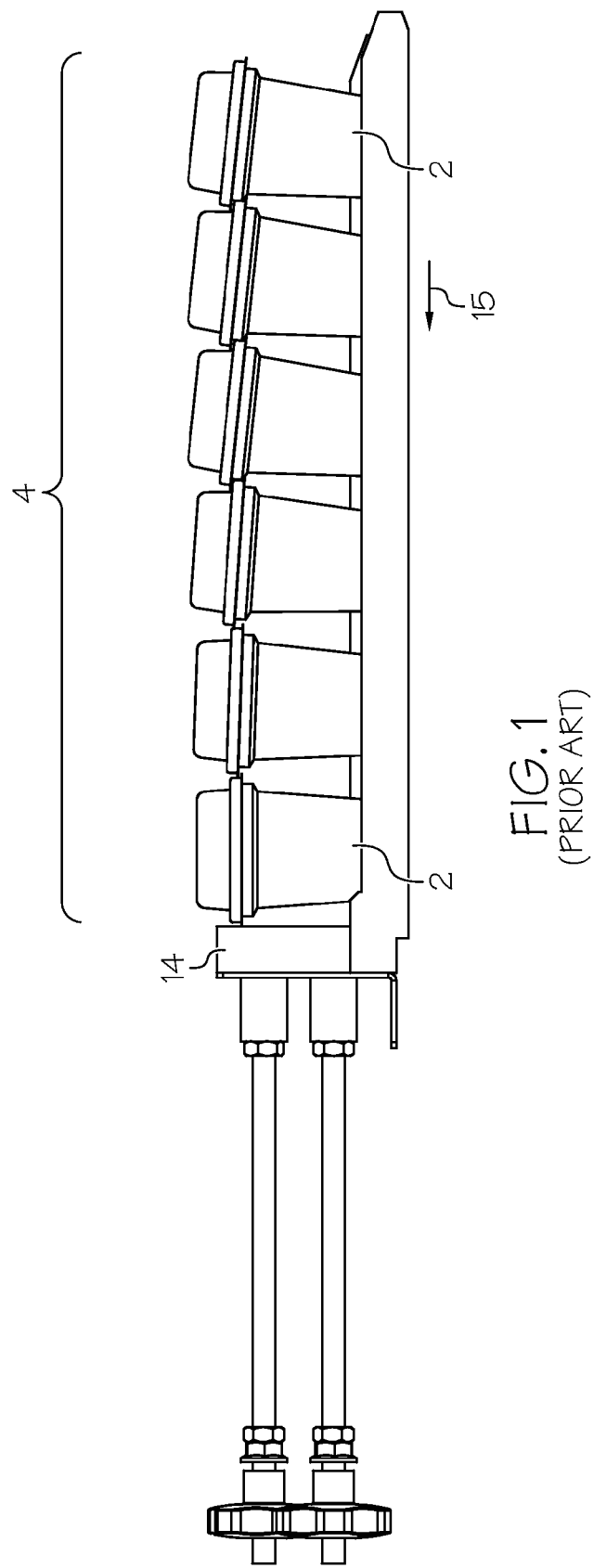
FIG. 1 shows a side view of product in a "shingled" configuration, in accordance with a PRIOR ART packaging line.

While this invention may be embodied in many different forms, there are described in detail herein specific embodiments. This description is an exemplification of the principles of the invention and is not intended to limit it to the particular embodiments illustrated.

For the purposes of this disclosure, like reference numerals in the figures shall refer to like features unless otherwise indicated.

Figure 2:
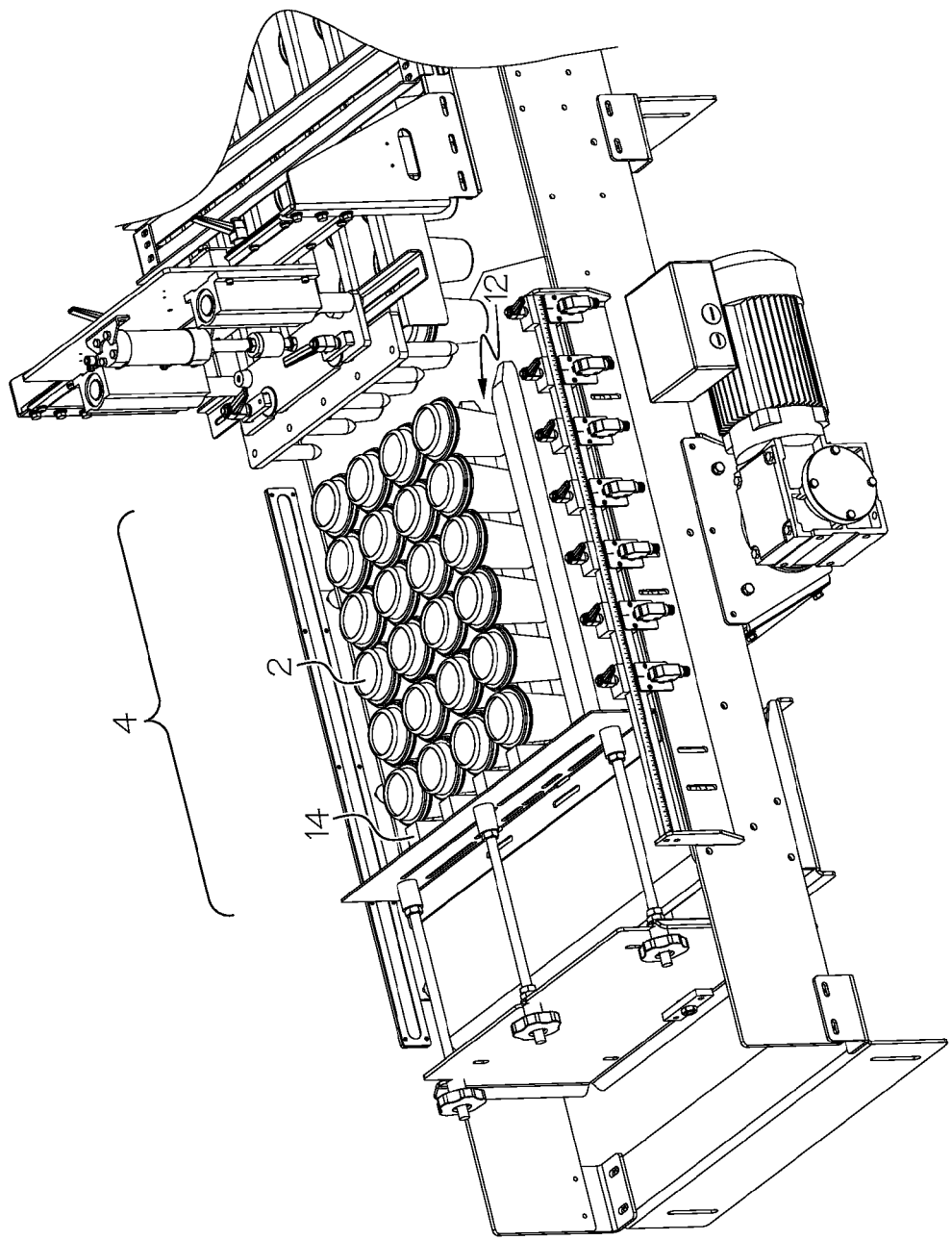
FIG. 2 shows a top-down view of a portion of a packaging line of the PRIOR ART.

Shown in PRIOR ART FIGS. 1 and 2, as the product 2 arrives in feed tracks 12, it begins to bunch up. The product 2 is stopped via the stop block 14. Although the product 2 is stopped via the stop block 14, a low speed conveyor (not shown) continues to operate in order to supply new product to the pick-up area 4, where the product 2 is picked-up from the product line 5. Further, the low speed conveyor is in contact with the base of the product 2, moving the product 2 in the direction of arrow 15. As a result, where the products 2 have a smaller base than top, they tend to tilt or "shingle," as illustrated in FIG. 1. This shingling, in turn, can make it difficult for a pick-up head (not shown) to pick the product 2 from the pick-up area 4.

Figure 3:
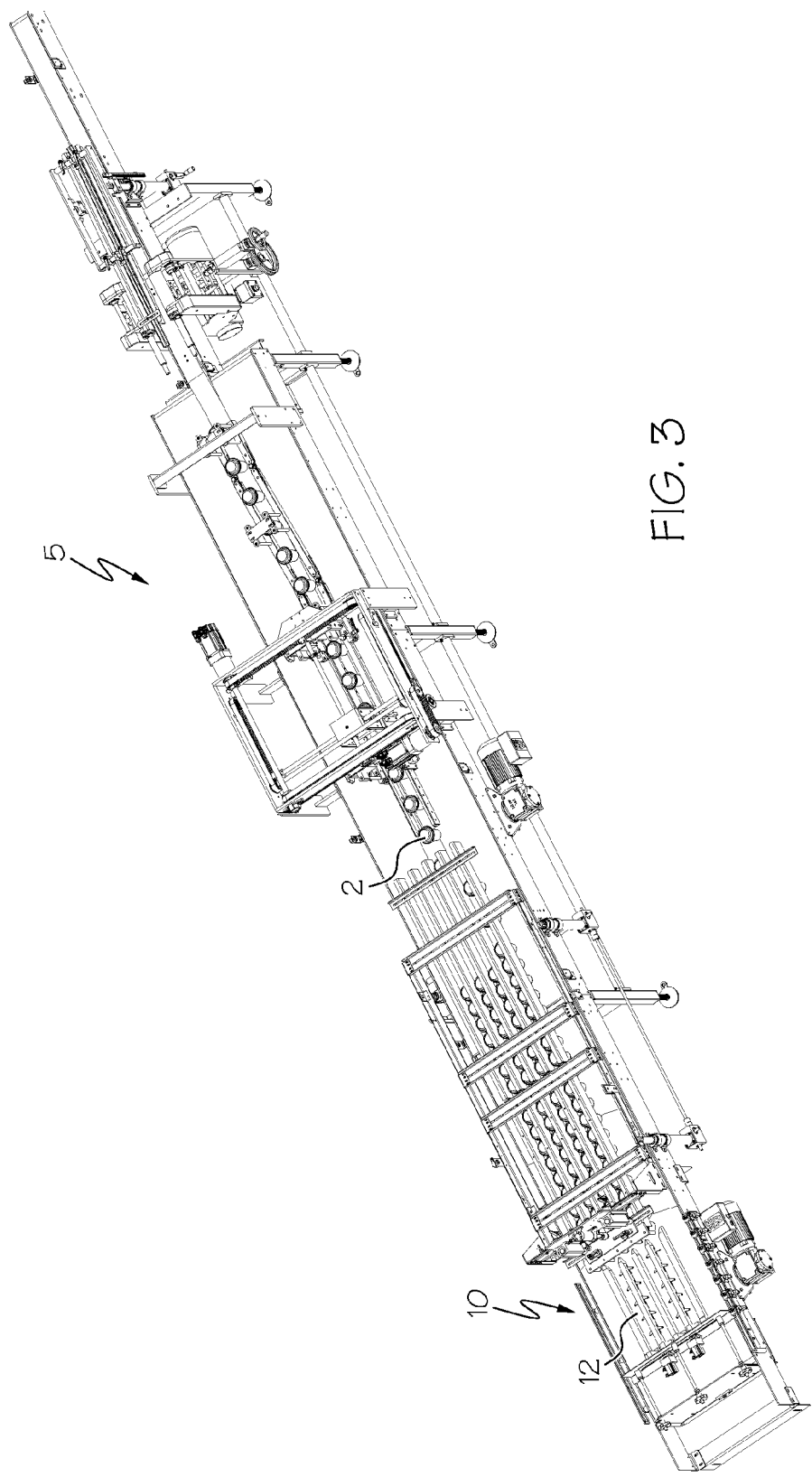
FIG. 3 shows a top-down view of a product stabilizer and packaging line.

With regard to FIG. 3, a product stabilizer 10 is shown in conjunction with a product line 5, wherein product 2 travels along the product line 5. As further shown in FIG. 3, the product stabilizer has four feed tracks 12, however, any desired number of feed tracks 12 is permissible (e.g., 1-30 or more).

Figure 4:
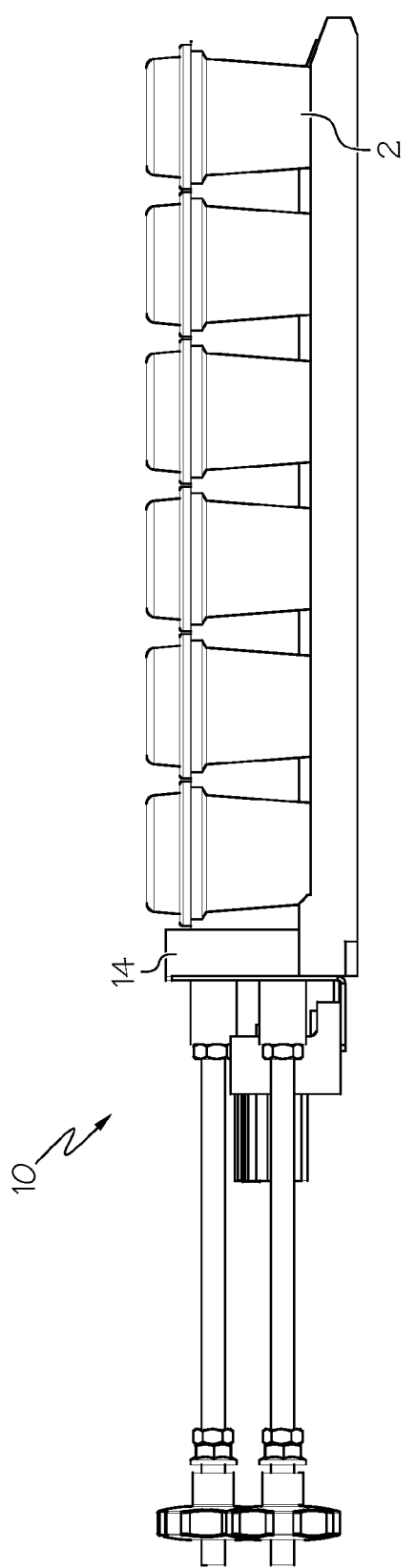
FIG. 4 shows a side view of product stabilizer and product in a stabilized configuration.

Turning to FIG. 4, the product 2 is shown in an upright configuration, where it has been acted upon by the product stabilizer 10.

Figure 5:
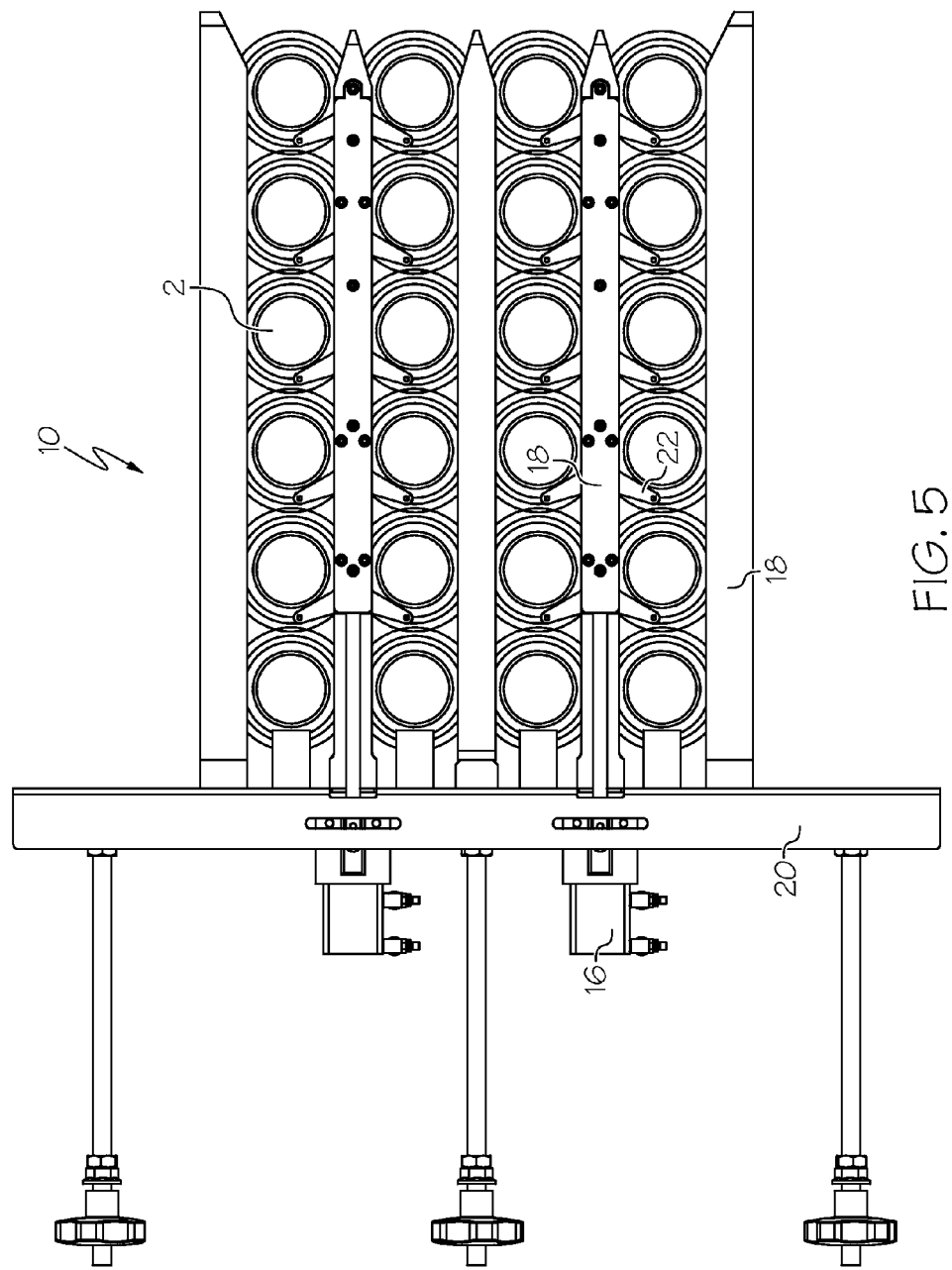
FIG. 5 shows a bottom-up view of an embodiment of a product stabilizer.

With regard to FIG. 5, the product stabilizer 10 is shown from the bottom-up. In some embodiments, the product stabilizer 10 includes an actuator 16 and a plurality of elongate members 18 extending from an end plate 20. In some embodiments, the elongate members 18 are spaced apart to arrange products 2 between the elongate members 18 in adjacent single-file rows. Extending from some of the elongate members 18 are arms 22. As shown in the embodiment of FIG. 5, the arms extend from every-other elongate member 18. The arms 22 are configured to contact the products 2 to prevent shingling.

Figure 6:
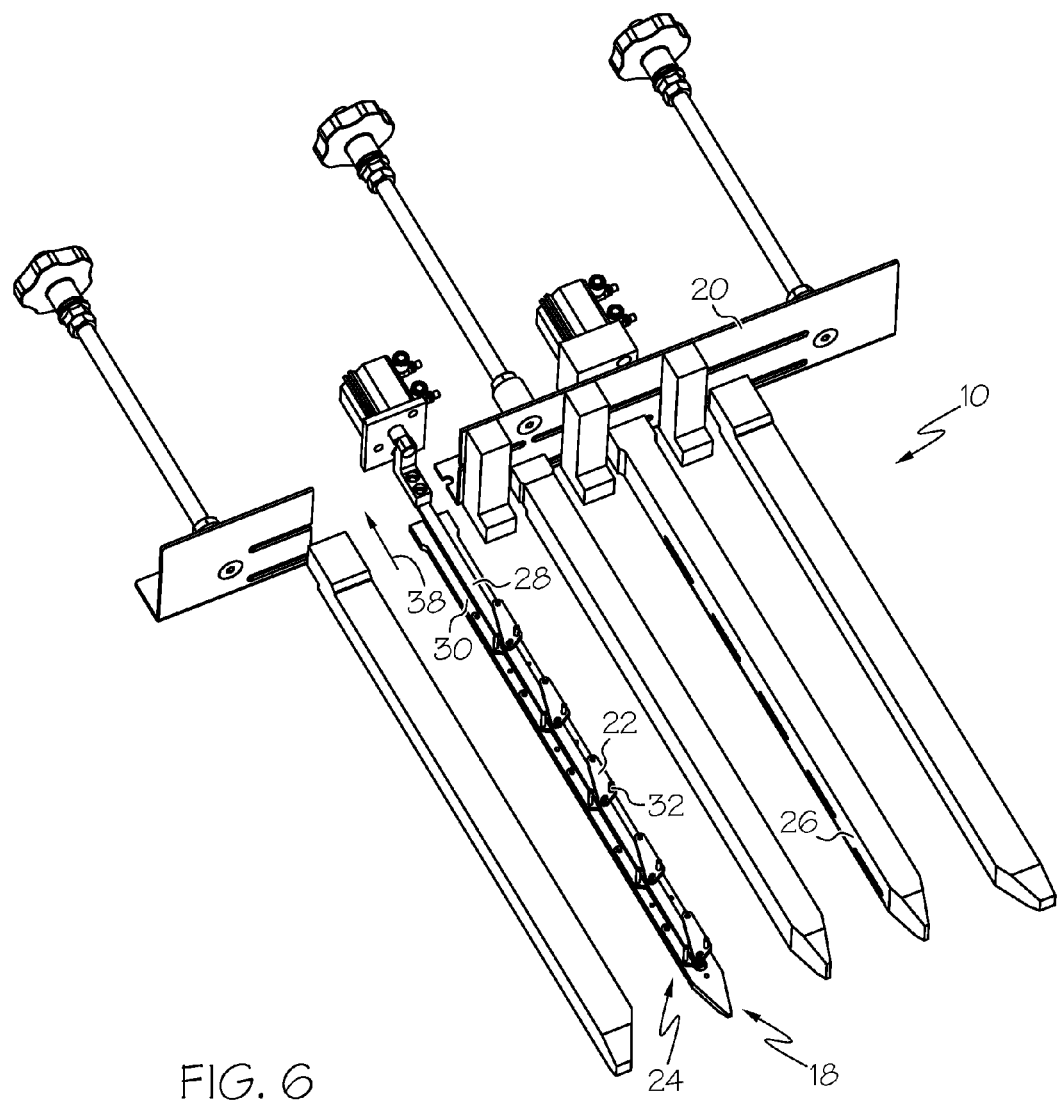
FIG. 6 shows a partial cutaway view of the product stabilizer of FIG. 5 in a first configuration.

With regard to FIG. 6, in some embodiments, the product stabilizer includes one or more elongate members 18 with arms 22 and one or more elongate members without arms. In FIG. 6, one of the elongate members 18 having arms 22 is shown in cutaway. The arms 22 are positioned in a first configuration 24, wherein the arms 22 are retracted within the housing 26.

Figure 10:
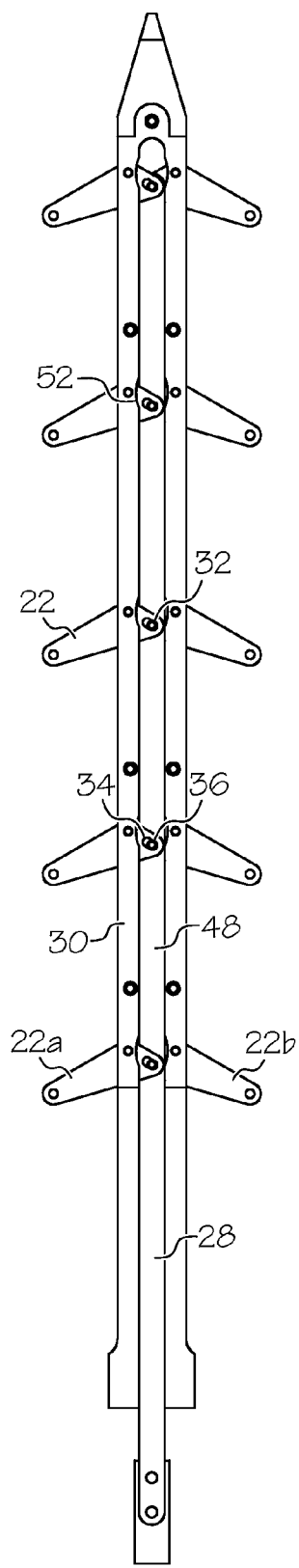
FIG. 10 shows a detailed bottom view of a portion of the product stabilizer of FIG. 5.

In some embodiments, the elongate member 18 further comprises a tie rod 28, which is attached to the actuator 16. In some embodiments, the arms 22 are coupled to the tie rod 28. As shown in FIG. 10, for example, the arms 22 are coupled to the tie rod 28 via elongate hole 34 and fastener 36. The fastener 36 can comprise any suitable configuration or type, for example, bolt, screw, pin, needle bearing.

Returning to FIG. 6, in some embodiments, the arms 22 are pivotally engaged to the frame 30 of the elongate member 18 via pivots 32. In this way, the actuator 16 can move tie rod 28 in the direction of arrow 38 and extend the arms 22 outwardly from the first (retracted) configuration 24.

Figure 7:
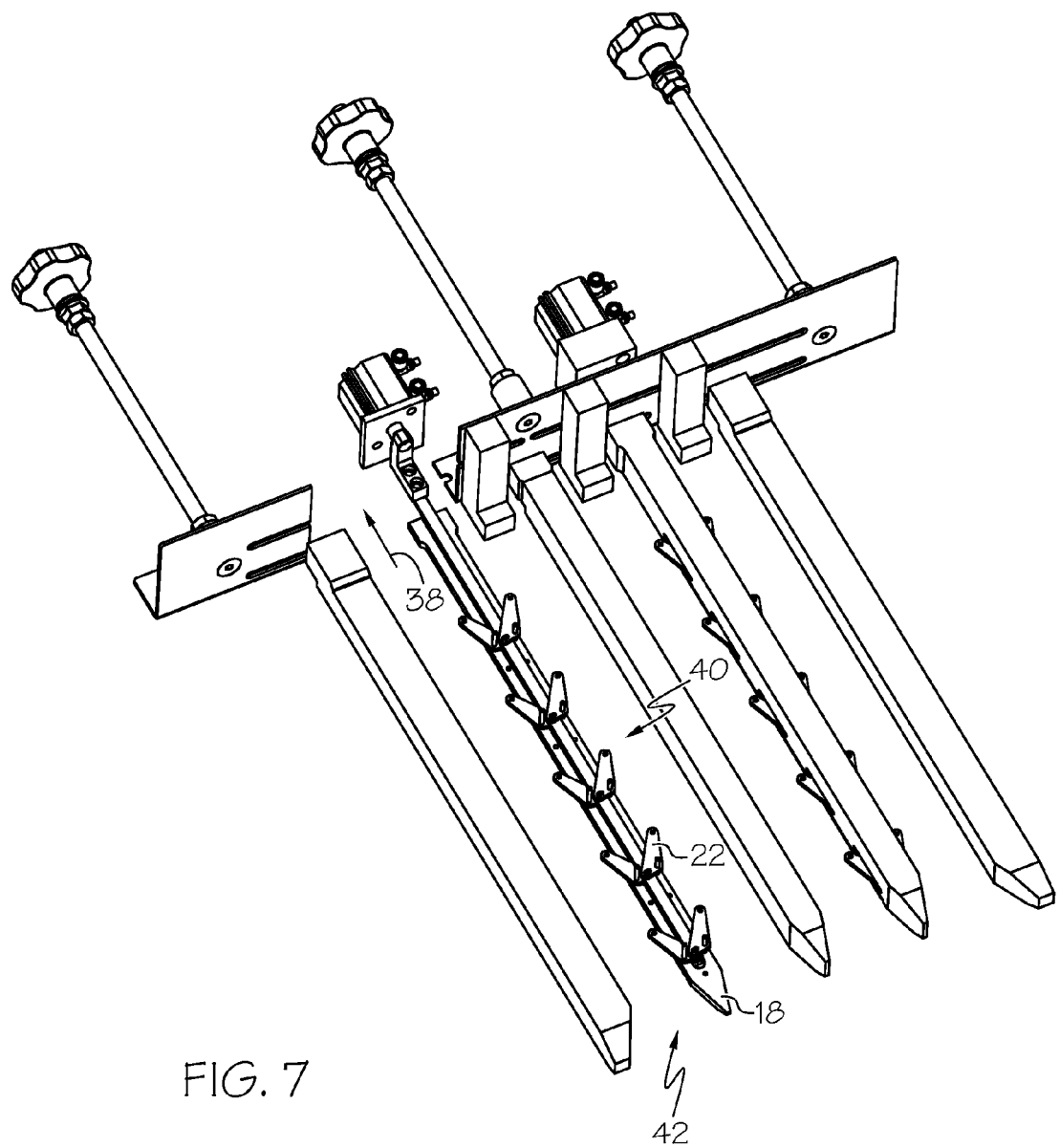
FIG. 7 shows a partial cutaway view of the product stabilizer of FIG. 5 in a second configuration.

FIG. 7, in turn, shows the arms 22 in a second configuration 42 wherein the arms 22 are extended as the tie rod 28 continues to move in the direction of arrow 38. In particular, in some embodiments, as the tie rod 28 moves in the direction of arrow 38, the arms 22 pivot around pivots 32. Further, the arms 22 extend into the space 40 between adjacent elongate members 18 in order to maintain proper separation of the products (not shown in FIG. 7) at their bases and prevent shingling.

Figure 8:
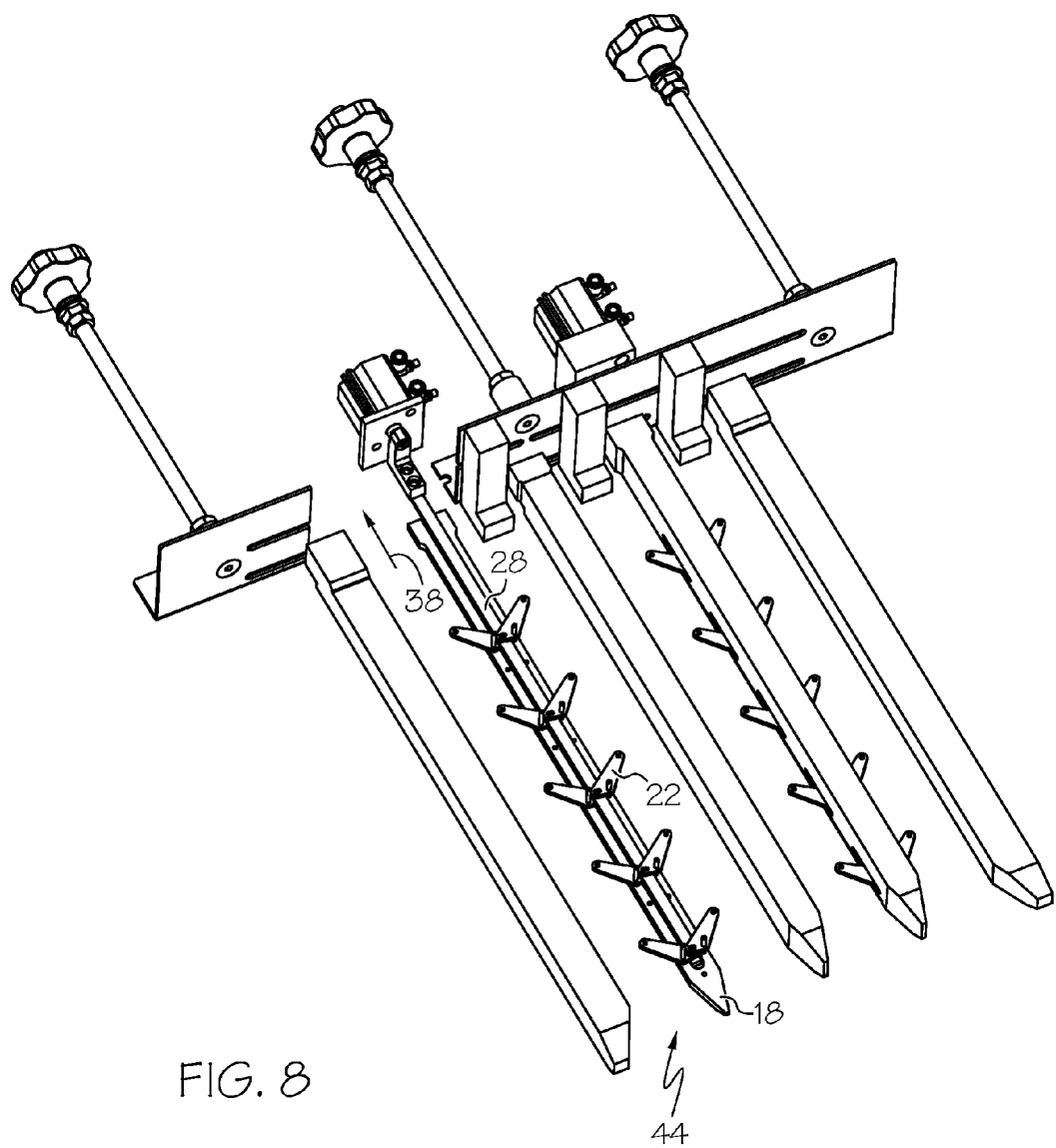
FIG. 8 shows a partial cutaway view of the product stabilizer of FIG. 5 in a third configuration.

FIG. 8 shows the arms 22 in a third configuration 44 wherein the arms 22 are further extended as the tie rod 28 travels in the direction of arrow 38.

Figure 9:
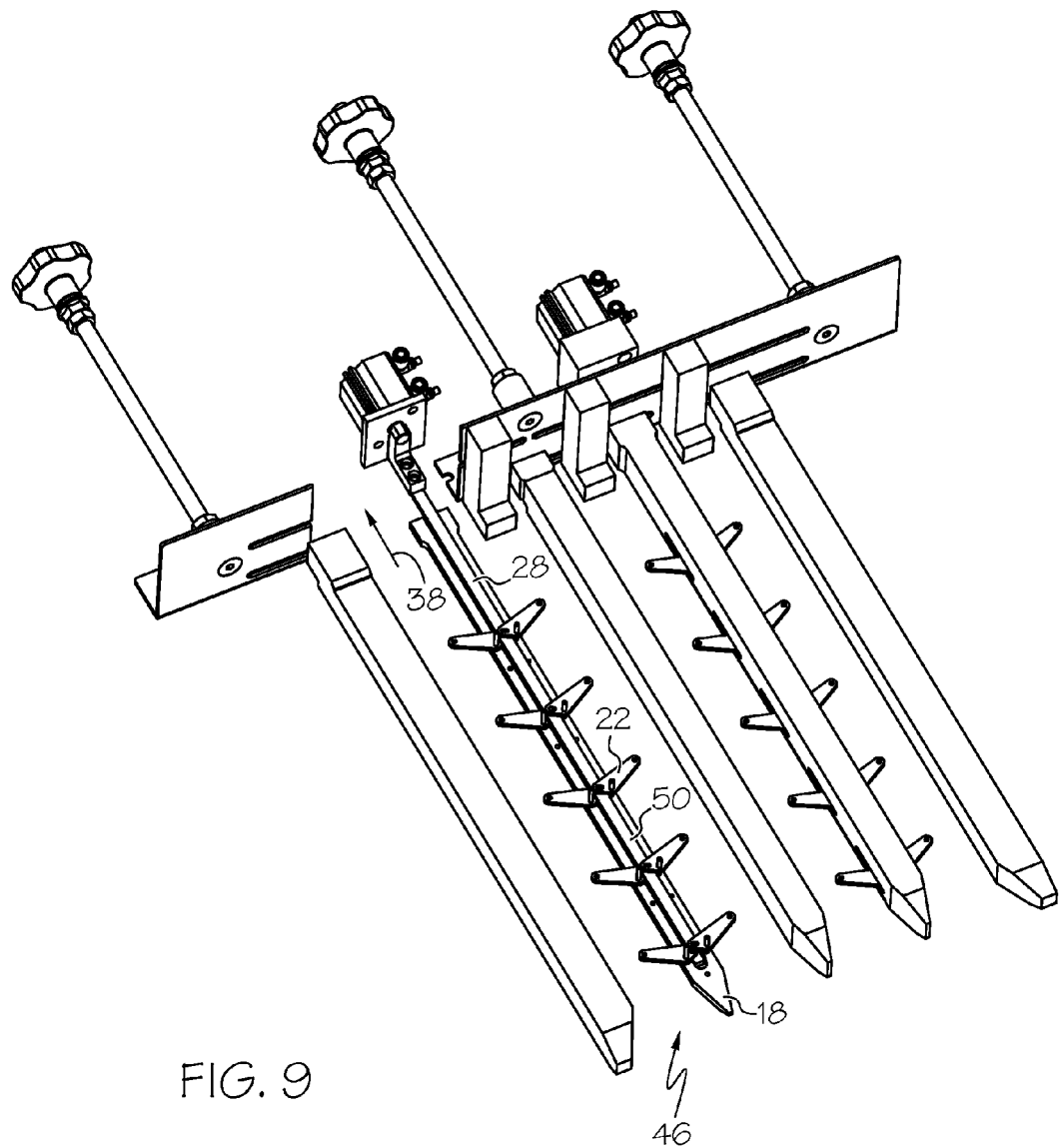
FIG. 9 shows a partial cutaway view of the product stabilizer of FIG. 5 in a fourth configuration.

Turning to FIG. 9, the arms 22 are shown in a fourth or extended configuration 46. In the fourth configuration, the arms 22 are positioned to provide the desired amount of separation between the product bases (not shown in FIG. 9) and prevent shingling. As will be appreciated, the amount of separation can be set by adjusting the throw of the actuator and/or the size of the arms 22 and/or the shape of the arms 22 and/or the orientation of the pivots 32 and fasteners 36.

With regard to FIG. 10, in some embodiments, the arms 22a located on the bottom side 48 of the tie rod 28 while arms 22b are located on the top side 50 (FIG. 9) of the tie rod 28. Additionally, in some embodiments, the fastener 36 extends through elongate holes 34 in both arms 22a and 22b. This arrangement of arms 22a, 22b results in a compact design which can be readily maintained. As further shown in FIG. 10, in some embodiments, the frame 30 has cut-outs 52 to provide adequate clearance for the arms 22 to rotate.

As the tie rod 28 moves, the arms 22 swing between the retracted configuration 24 (FIG. 6) and the extended configuration 46 (FIG. 9), or vice-versa, and the fastener 36 translates within the elongate hole 34. This translation of the fastener 36 within the elongate hole 34 results because the fastener 36 moves linearly with the tie rod 28 while the arms 22 arc around their pivots 32.

Figure 11:
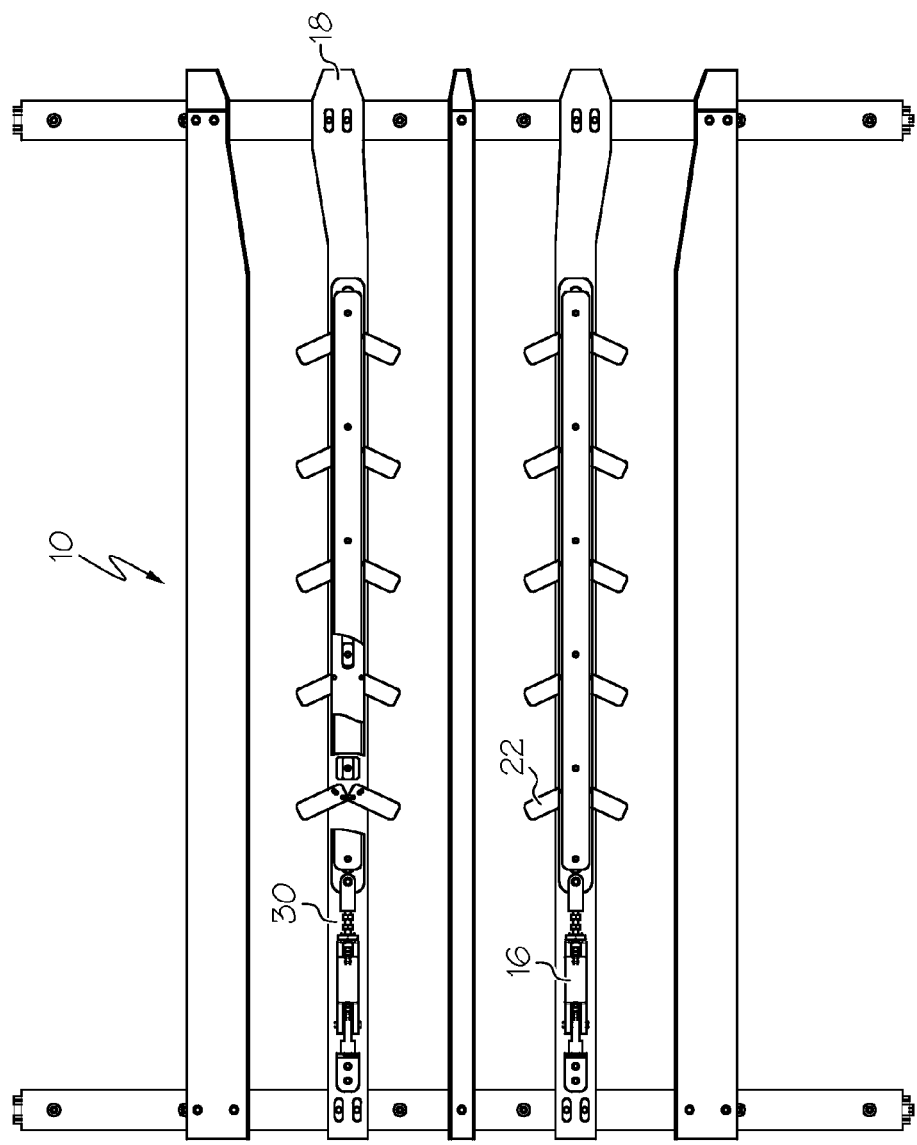
FIG. 11 shows a partial cutaway view of an embodiment of a product stabilizer.

FIG. 11 shows an embodiment of the product stabilizer 10 in a partial cutaway view. As shown, the actuator 16 is attached to the frame 30 of the elongate member 18. Additionally, the arms 22 have a rectangular shape with rounded edges.

Figure 12:
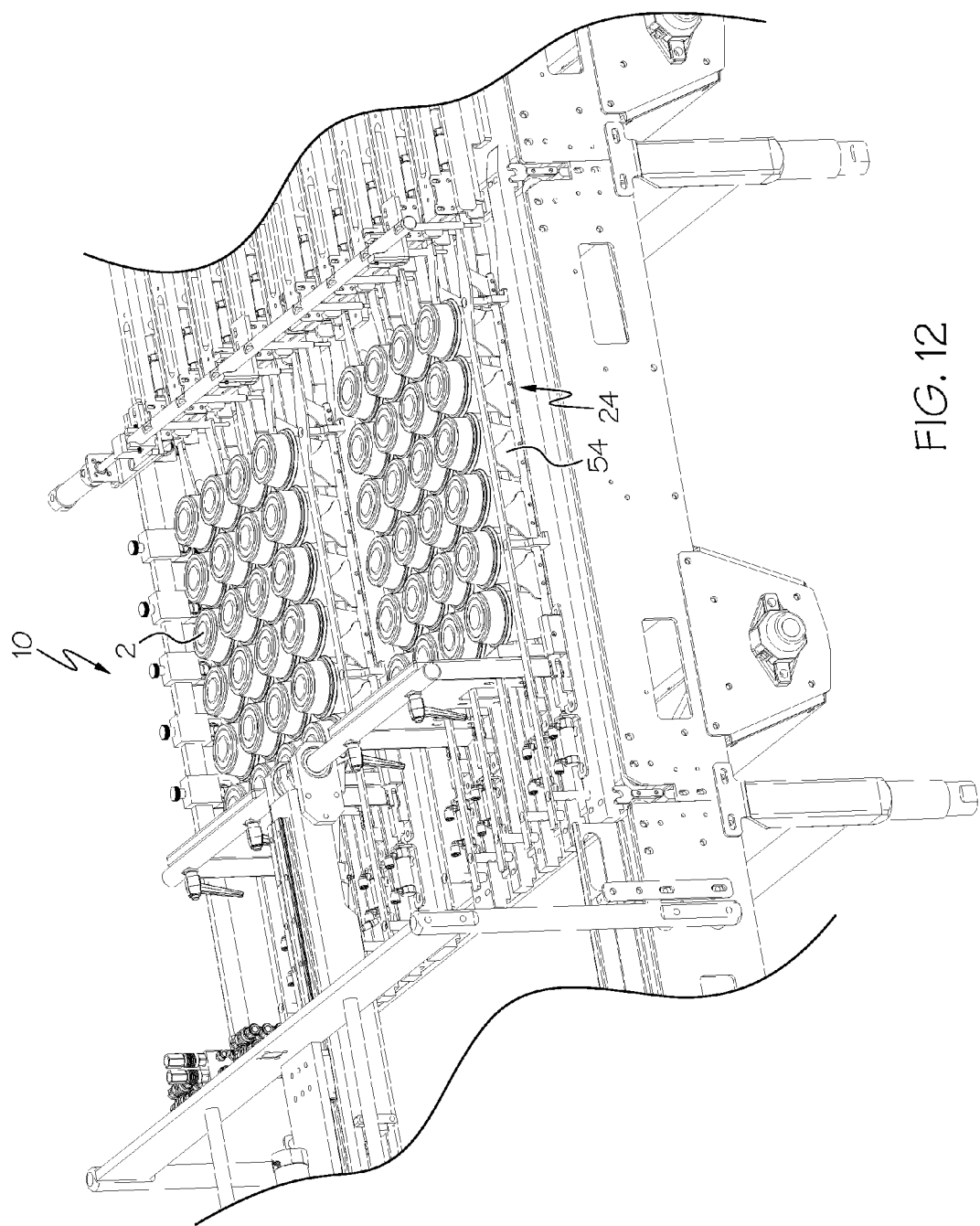
FIG. 12 shows an embodiment of a product stabilizer as used in conjunction with a product line.

In the embodiment of the product stabilizer 10 shown in FIG. 12, the product stabilizer 10 includes a plurality of paddle members 54. The paddle members 54 are configured to prevent shingling of the products 2 and to "un-shingle" products 2 that have become shingled. In FIG. 12, the products 2 are illustrated in a shingled configuration, wherein tops or lids of the products 2 are partially stacked or overlapping. Further, the paddle members 54 are shown in a first or retracted configuration 24.

Figure 13:
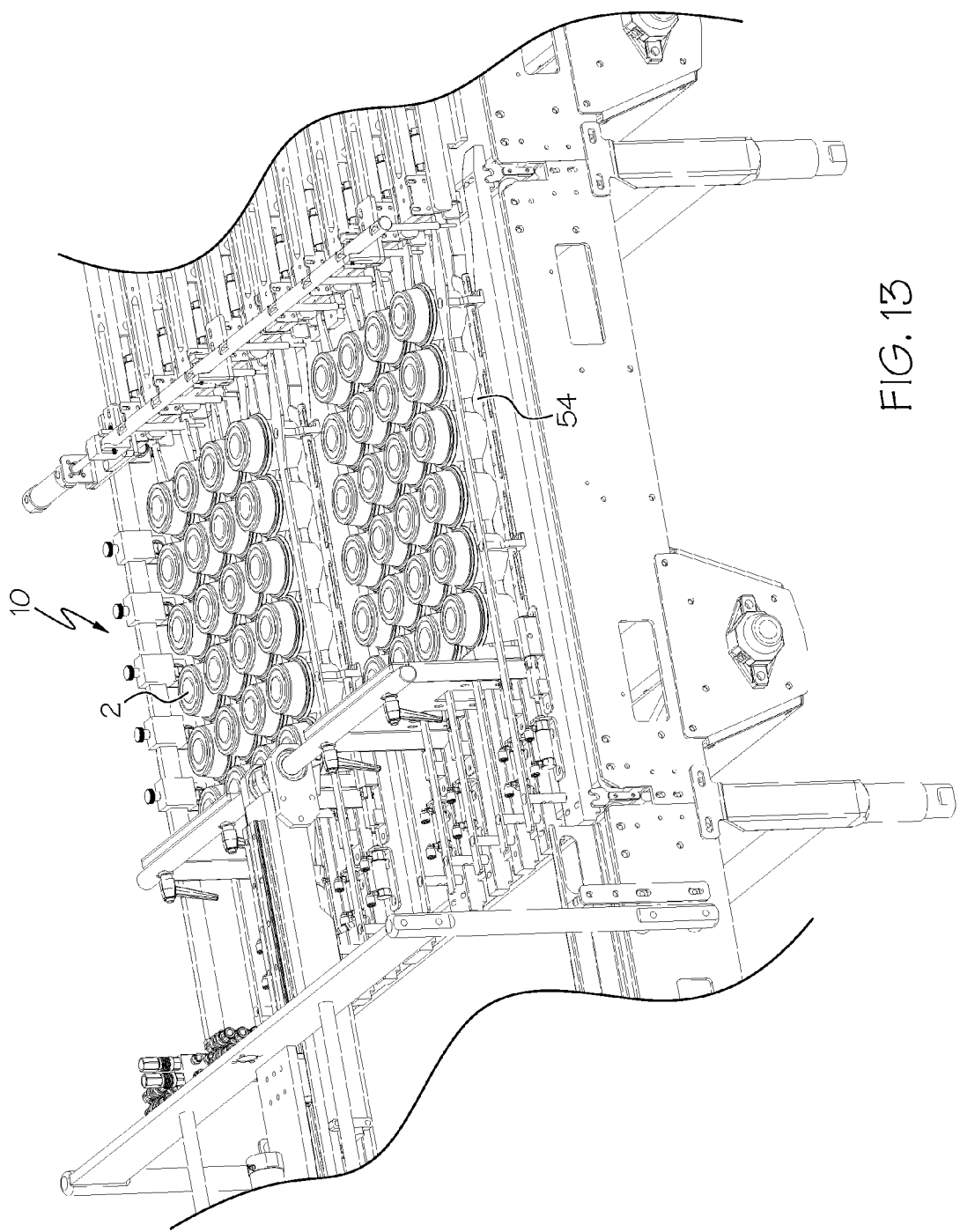
FIG. 13 shows the product stabilizer of FIG. 12 with the paddles engaged to the product to provide stabilization.

As illustrated in FIG. 13, however, the paddle members 54 have been moved to contact the products 2 and separate the products 2 at their bases.

Figure 14:
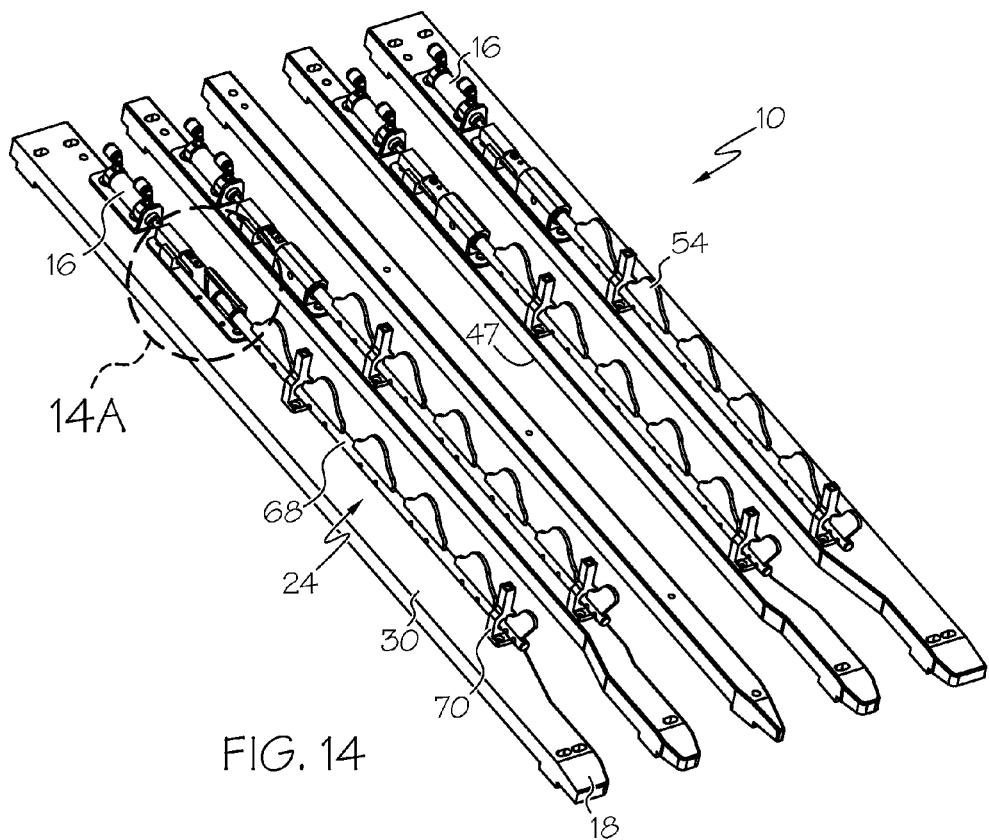
FIG. 14 shows the product stabilizer of FIG. 12 in a first configuration.
Figure 14A:
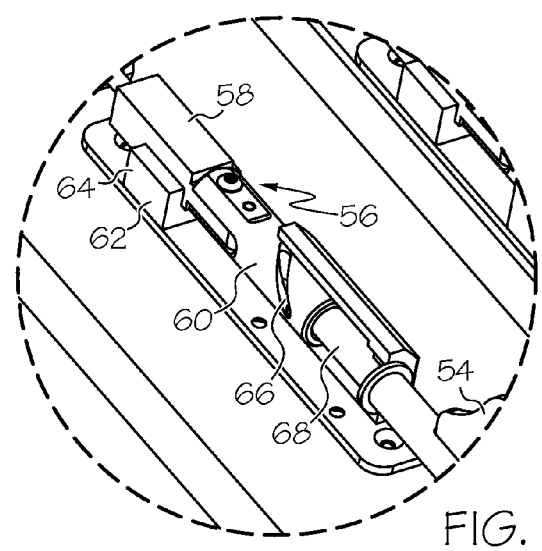
FIG. 14A shows a partial cutaway view of a portion of the product stabilizer, taken from FIG. 14.

Turning to FIG. 14, the product stabilizer 10 having paddle members 54 is shown in greater detail. As shown, the paddle members 54 are in a first or retracted configuration 24, wherein, for example, the paddle members 54 are arranged in an upright position.

As further illustrated in FIG. 14, in some embodiments, the product stabilizer 10 comprises an elongate member 18 having a frame 30. The frame 30 has a length 47 and an actuator 16 attached thereto. The actuator 16, in turn, is attached to a driven member 56. In some embodiments, the driven member 56 comprises a connecting member 58 and a cam member 60. In some embodiments, the actuator 16 is a linear actuator that pushes and/or pulls connecting member 58, translating the connecting member 58 relative to the guide 62, on which the connecting member rests. The guide 62 further provides lateral support for the connecting member 58 via opposing sides 64.

In some embodiments, the product stabilizer 10 further comprises a torque rod 68, which is supported by one or more support members 70. Attached to the torque rod 68 are paddle members 54, which rotate in conjunction with the torque rod 68.

The torque rod 68 has a guide pin 70 attached thereto (FIG. 15A), which resides in helical slot 66 of cam member 60. As further illustrated in FIGS. 15-17 and 15A-17A, the cam member 60 transforms the linear motion of the actuator 16 into rotational motion of the torque rod 68.

In some embodiments, the product stabilizer 10 further comprises a housing 72 attached to the frame 30. At least a portion of the cam member 60 is located within the housing 72. The housing 72 provides a stable environment within which the cam member 60 can translate. Further, the housing 72 shields the helical slot 66 from dust and debris.

Figure 15:
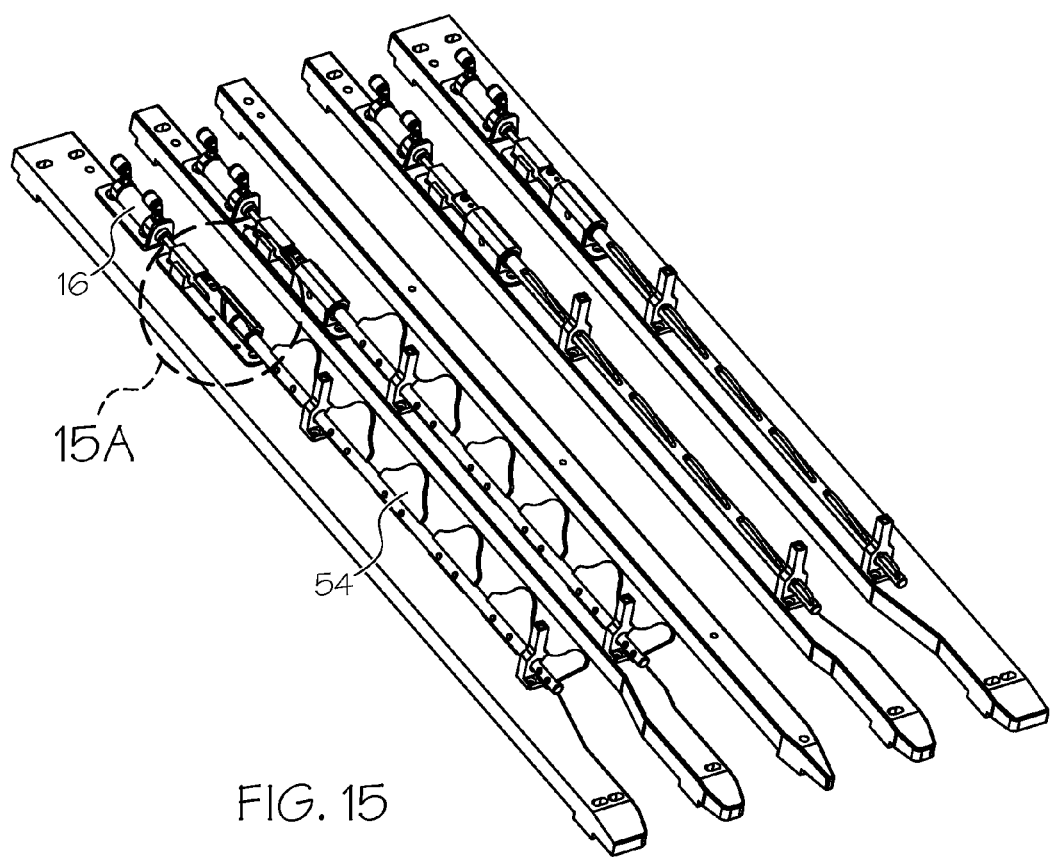
FIG. 15 shows the product stabilizer of FIG. 12 in a second configuration.
Figure 15A:
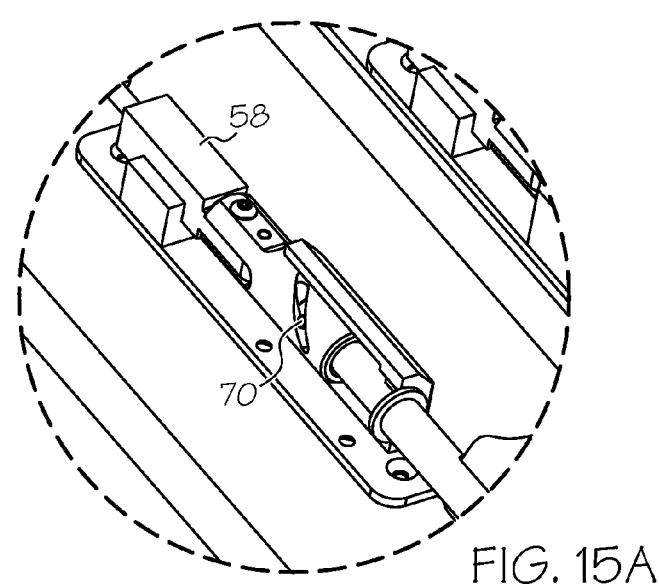
FIG. 15A shows a partial cutaway view of a portion of the product stabilizer, taken from FIG. 15.

With regard to FIGS. 15 and 15A, the paddle members 54 are rotated to a second configuration as the actuator 16 pushes the connecting member 58.

Figure 16:
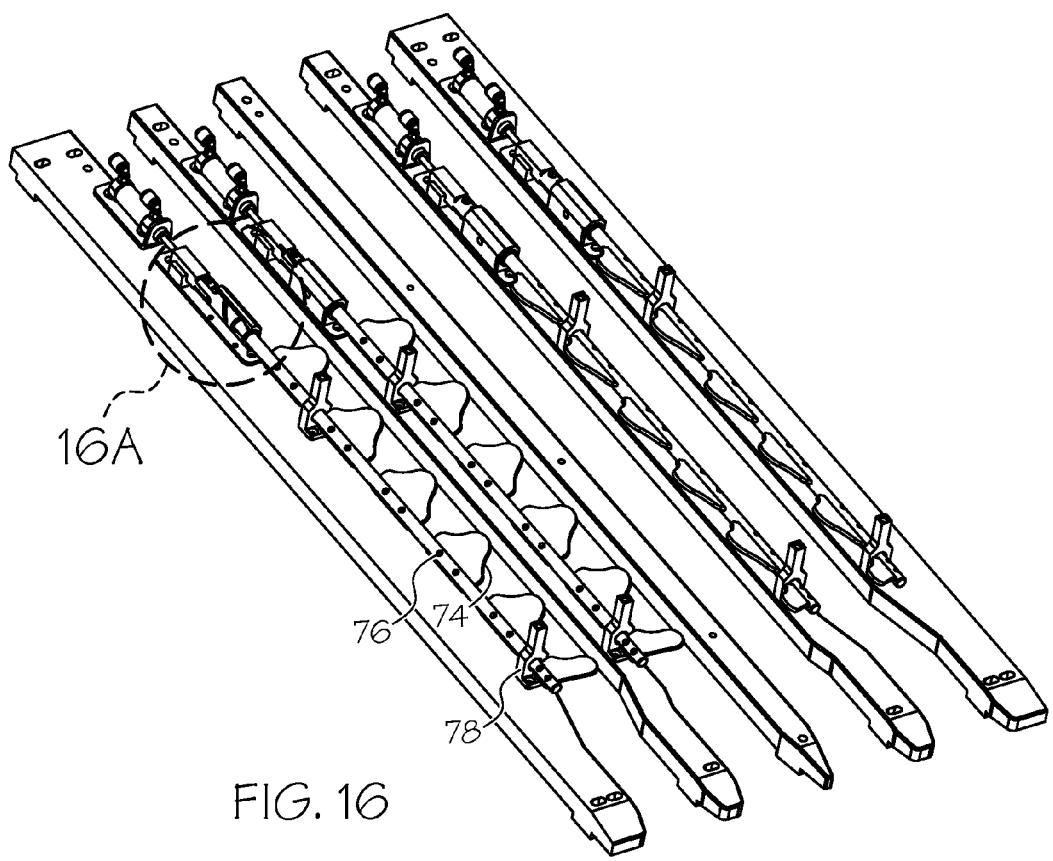
FIG. 16 shows the product stabilizer of FIG. 12 in a third configuration.
Figure 16A:
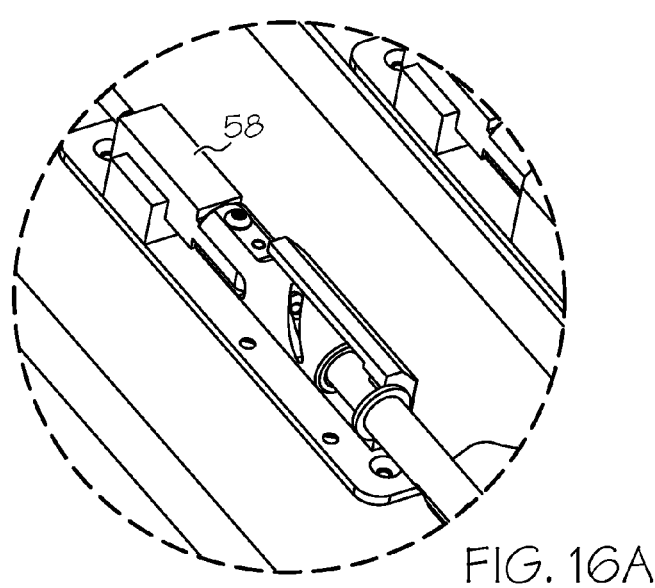
FIG. 16A shows a partial cutaway view of a portion of the product stabilizer, taken from FIG. 16.

In FIGS. 16 and 16A, the paddle members 54 have rotated to a third configuration, upon further linear movement of the connecting member 58.

Figure 17:
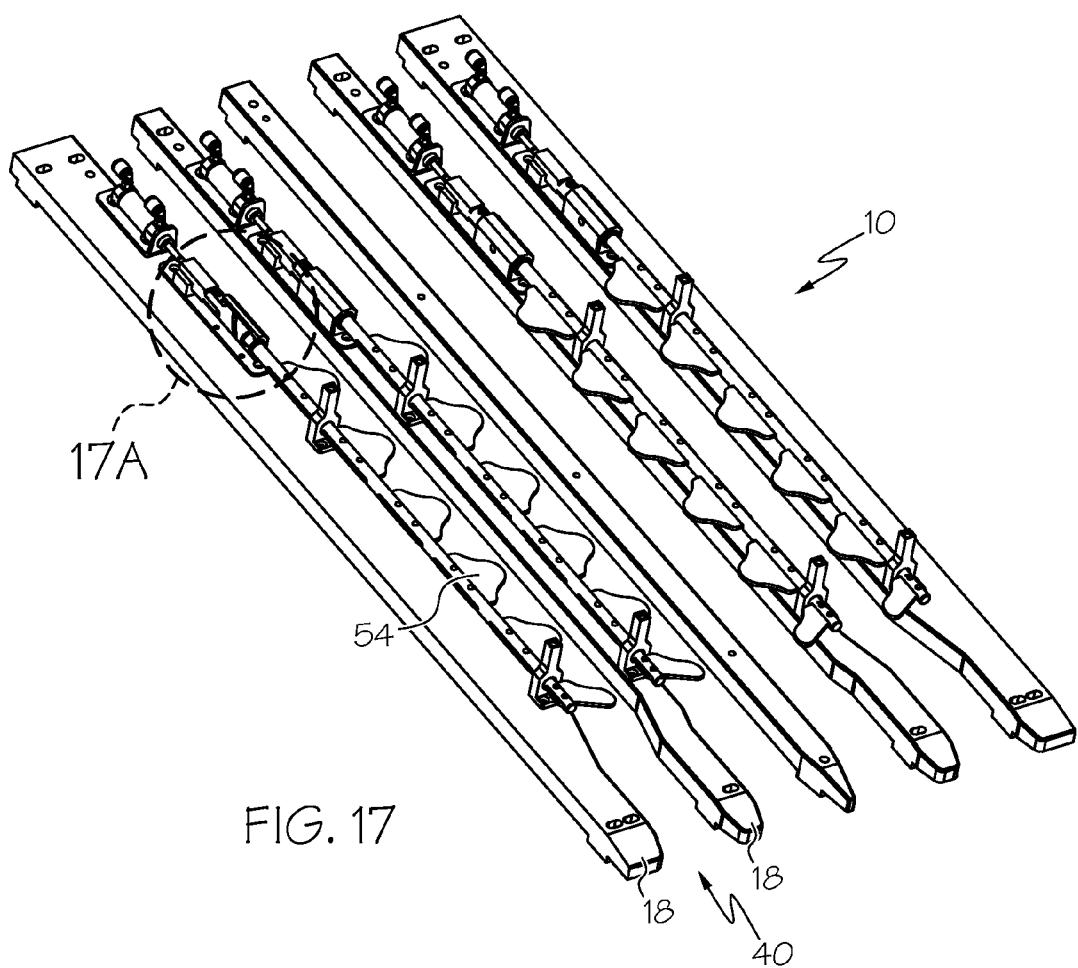
FIG. 17 shows the product stabilizer of FIG. 12 in a fourth configuration.
Figure 17A:
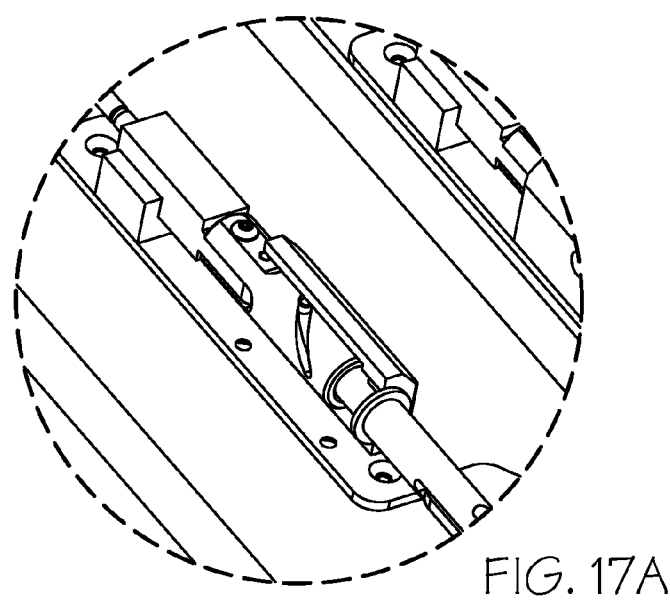
FIG. 17A shows a partial cutaway view of a portion of the product stabilizer, taken from FIG. 17.

Finally, in FIGS. 17 and 17A, the paddle members 54 have rotated to a fourth configuration, wherein the paddle members 54 provide the desired separation between the bases of adjacent products (not shown).

Although the cam member 60 is shown in FIGS. 14-17 having helical slot 66 and the torque rod 68 comprises guide pin 70, it will be appreciated that the relationship can be reversed—the torque rod 68 has a helical slot 66, while the cam member 60 comprises a guide 70. Other suitable arrangements are also permissible. For example, the actuator 16 can comprise a rotational actuator, which, in some embodiments, directly or indirectly, actuates the torque rod 68.

In some embodiments, the product stabilizer 10 has paddle members 54 extending into the space 40 between adjacent elongate members 18 from only one of the elongate members, as shown for example in FIG. 17. In some embodiments, however, the paddle members 54 can extend from both of the adjacent elongate members 18 into the space 40 therebetween. Any other suitable arrangement is also permissible.

Returning to FIG. 16, the paddle members 54 define a perimeter 74. In some embodiments, the perimeter 74 of at least one of the paddle members 54 has a portion thereof that is concave and a portion thereof that is convex. As will be evident, the shape of the paddle members 54 can be optimized to prevent shingling or un-shingle shingled products.

In some embodiments, the paddle members 54 can be swapped, for example by removing bolts 76 (or other fastener), and replaced with a different shape paddle member, depending upon the shape of the product.

In some embodiments, the torque rod 68 is supported along its length by one or more supports 78.

The above disclosure is intended to be illustrative and not exhaustive. This description will suggest many variations and alternatives to one of ordinary skill in this art. The various elements shown in the individual figures and described above may be combined or modified for combination as desired. All these alternatives and variations are intended to be included within the scope of the claims where the term "comprising" means "including, but not limited to".

Further, the particular features presented in the dependent claims can be combined with each other in other manners within the scope of the invention such that the invention should be recognized as also specifically directed to other embodiments having any other possible combination of the features of the dependent claims. For instance, for purposes of claim publication, any dependent claim which follows should be taken as alternatively written in a multiple dependent form from all prior claims which possess all antecedents referenced in such dependent claim if such multiple dependent format is an accepted format within the jurisdiction (e.g. each claim depending directly from claim 1 should be alternatively taken as depending from all previous claims). In jurisdictions where multiple dependent claim formats are restricted, the following dependent claims should each be also taken as alternatively written in each singly dependent claim format which creates a dependency from a prior antecedent-possessing claim other than the specific claim listed in such dependent claim below.

This completes the description of the invention. Those skilled in the art may recognize other equivalents to the specific embodiment described herein which equivalents are intended to be encompassed by the claims attached hereto.

What is claimed is:

1. A product stabilizer comprising:
    a plurality of elongate members, each of the elongate members having a length and a frame, at least one of the elongate members comprising:
        a tie rod extending along at least a portion of the length of the elongate member, the tie rod movable with respect to the frame; and
        a plurality of arms pivotally engaged to the frame and coupled to the tie rod, wherein the arms have an extended configuration and a retracted configuration, the arms moving between the retracted and extended configurations upon movement of the tie rod.

2. The product stabilizer of claim 1 further comprising a linear actuator, the tie rod attached to the linear actuator.

3. The product stabilizer of claim 1, wherein the tie rod comprises a plurality of fasteners and each of the arms has an elongate hole, the fasteners extending through the elongate holes.

4. The product stabilizer of claim 1, wherein the arms sweep an arc when moving between the retracted configuration and extended configuration.

5. The product stabilizer of claim 1, wherein arms are located on both sides of at least one of the elongate members.

6. A product stabilizer for stabilizing adjacent products in a packaging line, the product stabilizer comprising:
   a plurality of adjacent elongate members, each of the elongate members having a length and a frame, the elongate members defining a space between adjacent elongate members;
   a torque rod extending along at least a portion of the length of the frame;
   a plurality of paddle members attached to the torque rod;
   an actuator mounted to the frame, the actuator configured to rotate the torque rod and paddle members from a retracted configuration to a deployed configuration, wherein, in the deployed configuration, the paddle members extend into the space between adjacent elongate members and are configured to contact and separate adjacent products.

7. The product stabilizer of claim 6, wherein the actuator comprises a linear actuator.

8. The product stabilizer of claim 7 further comprises a helical cam connected to the linear actuator, the helical cam configured to translate the linear motion of the linear actuator into the rotational motion of the torque rod and paddle members.

9. The product stabilizer of claim 8, wherein the linear actuator is connected to a cam member, the cam member comprising a helical slot.

10. The product stabilizer of claim 9, wherein the torque rod has a guide pin, the guide pin extending into the helical slot.

11. The product stabilizer of claim 10 further comprises a housing attached to the frame, the cam member disposed at least partially within the housing.

12. The product stabilizer of claim 6, wherein the paddles define a perimeter, the perimeter of at least one of the paddles having a concave portion and a convex portion.

13. A system for stabilizing a conveyed product comprising:
   a plurality of adjacent elongate members configured to receive products therebetween in single-file;
   an actuator having coupled thereto a plurality of product separating members, the product separating members movable by the actuator between a product contacting configuration and a retracted configuration, wherein, in the product contacting configuration, the separating members separate at least a portion of adjacent products, arranged in single-file, from one another.

14. The system of claim 13, wherein each of the elongate members comprise a frame, the actuator attached to at least one of the frames.

15. The system of claim 13 further comprising an end plate, the actuator attached to the end plate.

16. The system of claim 13, wherein the product separating members comprise fingers.

17. The system of claim 13, wherein the product separating members comprise paddle members.

* * * * *